United States Patent
Oviedo

(10) Patent No.: US 10,514,182 B1
(45) Date of Patent: Dec. 24, 2019

(54) AUTOMATIC SELF-CLEANING EVAPORATOR DRAIN PAN SYSTEM

(71) Applicant: Alain Oviedo, Miami, FL (US)

(72) Inventor: Alain Oviedo, Miami, FL (US)

( * ) Notice: Subject to any disclaimer, the term of this patent is extended or adjusted under 35 U.S.C. 154(b) by 46 days.

(21) Appl. No.: 15/829,438

(22) Filed: Dec. 1, 2017

(51) Int. Cl.
*F25D 21/14* (2006.01)
*F24F 13/22* (2006.01)
*C02F 1/68* (2006.01)
*C02F 1/50* (2006.01)

(52) U.S. Cl.
CPC ............. *F24F 13/222* (2013.01); *C02F 1/50* (2013.01); *C02F 1/686* (2013.01); *C02F 2303/20* (2013.01); *F24F 2013/228* (2013.01); *F24F 2221/225* (2013.01)

(58) Field of Classification Search
CPC .... C02F 1/50; C02F 1/008; C02F 1/68; C02F 1/685; C02F 1/686; C02F 2303/04; C02F 1/76; C02F 2307/12; C02F 2307/14; C02F 2303/20; F24F 2013/228; F24F 2013/222; F24F 2013/221; F24F 3/1603; F24F 13/222; F24F 13/22; F24F 2221/225
See application file for complete search history.

(56) References Cited

U.S. PATENT DOCUMENTS

| | | | |
|---|---|---|---|
| 4,962,778 A | 10/1990 | Driskill | |
| 5,398,517 A * | 3/1995 | Poindexter | B01D 5/0039 62/125 |
| 5,514,344 A | 5/1996 | D'Agaro | |
| 6,892,907 B2 | 5/2005 | Varney | |
| 7,392,658 B1 * | 7/2008 | Hardy, III | A23L 3/36 137/15.05 |
| 7,857,004 B2 * | 12/2010 | Pearson | B60H 1/3233 137/240 |
| 8,475,603 B2 | 7/2013 | Kaiser | |
| 8,840,729 B1 | 9/2014 | Herren et al. | |
| 9,352,896 B2 | 5/2016 | Reinolds | |
| 2004/0250841 A1 | 12/2004 | Kimbrough et al. | |
| 2006/0096307 A1 | 5/2006 | Coogle | |
| 2010/0032030 A1 * | 2/2010 | Peterson | C02F 1/325 137/561 R |
| 2011/0308546 A1 | 12/2011 | Kaiser | |
| 2012/0323375 A1 * | 12/2012 | Dean-Hendricks | F24F 3/1603 700/276 |
| 2013/0001142 A1 * | 1/2013 | Novak | C02F 3/006 210/96.2 |
| 2014/0216071 A1 * | 8/2014 | Broadbent | H04L 12/281 62/66 |

* cited by examiner

*Primary Examiner* — Henry T Crenshaw
*Assistant Examiner* — Kamran Tavakoldavani
(74) *Attorney, Agent, or Firm* — Albert Bordas, P.A.

(57) ABSTRACT

An automatic self-cleaning evaporator drain pan system, having a container housing with a chemical container and a smart control pump. The smart control pump has at least one microprocessor. An evaporator drain system has at least one sensor connected to the smart control pump; and further having an electrical system. The container housing has a container tubing, and a chemical conduit with first and second chemical delivery lines. The chemical conduit extends from the smart control pump to the evaporator drain system, transporting a chemical composition. In operation, the chemical composition is mixed with condensed water and drains from the drain outlet toward a drainage line, whereby the chemical composition prevents microorganism growth, algae, gunk and/or other solid material from forming on the drain pan and the drainage line.

9 Claims, 2 Drawing Sheets

AUTOMATIC SELF-CLEANING EVAPORATOR DRAIN PAN SYSTEM

BACKGROUND OF THE INVENTION

1. Field of the Invention

The present invention relates to heating, ventilation, and air conditioning systems, and more particularly, to automatic self-cleaning evaporator drain pan systems for heating, ventilation, and air conditioning systems.

2. Description of the Related Art

Applicant believes that one of the closest references corresponds to U.S. Pat. No. 4,962,778 issued to Brent J. Driskill on Oct. 16, 1990 for Backwashing dispenser for air conditioner drain pans. However, it differs from the present invention because Driskill teaches a mechanical/chemical cleaning apparatus for clearing air conditioner reservoir or a drain pan flow lines of algae and other solid material includes a special fitting with an internal flexible conduit which can extend or retract within the drain line for mechanically/chemically treating the flow line to remove solid material therefrom.

Applicant believes that another reference corresponds to U.S. Pat. No. 5,514,344 issued to Raymond D'Agaro on May 7, 1996 for Solution for air conditioning microorganism control. However, it differs from the present invention because D'Agaro teaches a control of microorganism growth within water chambers of air conditioning systems by the periodic introduction of minute quantities of biocidal materials. A large volume reservoir holds a concentrated solution of biocidal material. A pump, fed from the reservoir, pumps the solution through a tube to the water chamber. The pump is actuated for very short duration periods so that only a very small volume of the solution is dispensed. The time interval between periods is very long so that the biocide concentration in the water chamber is renewed as required. The duration of the pumping periods and the time interval between periods are adjustable by controls in a timer. A normally closed check valve in the line keeps the line full between periods. An antisiphon mechanism is provided in the line when it branches. An alarm mechanism is optionally provided to warn when the reservoir solution is depleted.

Applicant believes that another reference corresponds to U.S. Pat. No. 6,892,907 issued to Theodore Sherwood Varney on May 17, 2005 for Condensate drip pan decontaminant device. However, it differs from the present invention because Varney teaches a device for holding and dispensing a fluid for decontaminating a condensate drip pan of an air conditioner includes: (a) a vessel at one end of the device for holding the fluid; and (b) at least one fluid line having a first end inserted in a lower end of the vessel, and an opposite, lower, second end inserted in the drip or drain pan; (c) a flow control device on the fluid line for controlling a rate of fluid drip from the fluid line into the drip or drain pan; and (d) a drip chamber in the fluid line.

Applicant believes that another reference corresponds to U.S. Pat. No. 7,392,658 issued to William G. Hardy, III on Jul. 1, 2008 for Automated air conditioner drain line clean-out system. However, it differs from the present invention because Hardy teaches a cleaning system for an air conditioner injects a biocide followed at regular intervals, which may be followed by a rinsing flush.

Applicant believes that another reference corresponds to U.S. Pat. No. 8,475,603 issued to Stewart Kaiser on Jul. 2, 2013 for Self-sanitizing automated condensate drain cleaner and related method of use. However, it differs from the present invention because Kaiser teaches a system and method for sanitizing a condensate drain to reduce sludge and related pathogens. The system is directed to a sanitizing assembly having a treatment chamber connected to the condensate drain, where the treatment chamber includes a top end and a shaft. A spray assembly is positioned proximate to the top end of the treatment chamber. This spray assembly has a nozzle spray connected to a hot water source. A spray controller within the spray assembly helps disperse a sufficient quantity and pressure of hot water within the shaft to dislodge sludge, when necessary.

Applicant believes that another reference corresponds to U.S. Pat. No. 8,840,729 issued to Herren, et al. on Sep. 23, 2014 for Air conditioning drain cleaning system. However, it differs from the present invention because Herren, et al. teach an air conditioning drain cleaning system with an automated blow-out cycle to clean out an evaporator pan drain pipe. The system has a pneumatic valve assembly, a controller, a float level switch assembly and a plurality of air lines in a manifold for actuating the pneumatic valve assembly and blowing out the drain pipe. The controller directs the system to initiate or repeat a blow-out cycle until the drain pipe is clear. The pneumatic valve assembly bisects the drain pipe to selectively close the pipe for cleaning with a pair of high pressure air shots, one shot toward each pipe end to dislodge a clog. The float level switch assembly signals the controller if the condensate level in the drain pan drops. If the condensate level does not drop, the controller initiates a further blow-out cycle at increased pressures until the line is clear.

Applicant believes that another reference corresponds to U.S. Pat. No. 9,352,986 issued to Ronald C. Reinolds on May 31, 2016 for Drain pan treatment apparatus utilizing recycled condensate water. However, it differs from the present invention because Reinolds teaches a drain pan treatment apparatus utilizing recycled condensate water to create a chemical solution that is delivered into the drain pan to prevent growth of algae and other microorganisms that may clog the drain port or drain outlet. The drain pan treatment apparatus could be in or in combination with an evaporative air conditioner system having no external water source delivering water to the air handler unit. The drain pan treatment apparatus comprises a diverter connector that directs a small amount of condensate water from the drain conduit or drain pump into a chemical canister containing a soluble solid chemical to create a chemical solution. The chemical solution is then delivered into the drain pan. If the air conditioner system does not include a drain pump, then a drain pump is added to deliver the condensate water to the chemical canister.

Applicant believes that another reference corresponds to U.S. Patent Application Publication No. 20040250841, published on Dec. 16, 2004 to Kimbrough, Atwood M., et al. for HVAC enviro-clean condensate drain pan and coil cleaning system. However, it differs from the present invention because Kimbrough, et al. teach a HVAC Enviro-Clean Condensate Drain Pan and Coil Cleaning System that accommodates the introduction of non-corrosive algaecides and/or biocides and cleaner fluids via an internal reservoir and plastic hosing system inside a HVAC condensate drain pan.

Applicant believes that another reference corresponds to U.S. Patent Application Publication No. 20060096307, published on May 11, 2006 to Gregory Coogle for Chemical delivery system for condensate drainage pipe. However, it differs from the present invention because Coogle teaches a chemical delivery system for inhibiting growth in a condensate drainage pipe of an air conditioner. It includes a reservoir body having an open upper end, an opposing open lower end and a central cavity; an inlet tubular connector mounted perpendicularly to the reservoir body adjacent to the open upper end of reservoir body; an outlet tubular connector mounted perpendicularly to the reservoir body between the inlet tubular connector and the lower end of the reservoir body; a liquid level sensor disposed within the outlet tubular connector; a tubular cleaning spout having one end mounted perpendicularly to the reservoir body opposing the inlet tubular connector, an opposing spout opening, and a removable spout cap; a removable top cap; and a bottom cap removably connected to the open lower end of the reservoir body; thereby closing the central cavity for receiving a grown inhibiting chemical.

Applicant believes that another reference corresponds to U.S. Patent Application Publication No. 20110308546, published on Dec. 22, 2011 to Stewart Kaiser for Self-Sanitizing Automated Condensate Drain Cleaner and Related Method of use. However, it differs from the present invention because Kaiser teaches a system and method for sanitizing a condensate drain to reduce sludge and related pathogens. The system is directed to a sanitizing assembly having a treatment chamber connected to the condensate drain, where the treatment chamber includes a top end and a shaft. A spray assembly is positioned proximate to the top end of the treatment chamber. This spray assembly has a nozzle spray connected to a hot water source. A spray controller within the spray assembly helps disperse a sufficient quantity and pressure of hot water within the shaft to dislodge sludge, when necessary.

Other patents describing the closest subject matter provide for a number of more or less complicated features that fail to solve the problem in an efficient and economical way. None of these patents suggest the novel features of the present invention.

SUMMARY OF THE INVENTION

The present invention is an automatic self-cleaning evaporator drain pan system, comprising a container housing having a chemical container and a smart control pump. The smart control pump comprises at least one microprocessor. An evaporator drain system comprises at least one sensor connected to the smart control pump; and further comprising an electrical system.

The container housing comprises a bottom wall, a top wall, first and second lateral walls, and a rear wall. The container housing further comprises a container tubing, and a chemical conduit with first and second chemical delivery lines. The chemical container comprises a mouth and a tubing hole. The container tubing extends from the chemical container. The chemical container contains a chemical composition. The container tubing extends to the smart control pump. The chemical conduit extends from the smart control pump to the evaporator drain system, transporting the chemical composition. The smart control pump pumps the chemical composition through the chemical conduit. The first and second chemical delivery lines extend from the chemical conduit to deliver the chemical composition. The container housing further comprises at least one display connected to the smart control pump.

The evaporator drain system comprises a blower fan, evaporator coils, a drain pan, and an air filter. The first and second chemical delivery lines deliver the chemical composition onto the drain pan. The evaporator drain system further comprises a drain outlet and a drainage line. The chemical composition is mixed with condensed water on the drain pan. Extending from the chemical conduit is a conduit that connects to the drainage line to directly deliver the chemical composition to the drainage line. The at least one sensor is activated when the air filter needs replacement and/or when the drain pan is running out of the chemical composition. The at least one microprocessor receives signals from the at least one sensor to regulate a pumping frequency of the chemical composition.

In operation, the chemical composition mixed with the condensed water drains from the drain outlet toward the drainage line, whereby the chemical composition prevents microorganism growth, algae, gunk and/or other solid material from forming on the drain pan and the drainage line.

It is therefore one of the main objects of the present invention to provide automatic self-cleaning evaporator drain pan systems for heating, ventilation, and air conditioning systems.

It is another object of this invention to provide an automatic self-cleaning evaporator drain pan system, which has a smart control pump to deliver a chemical composition.

It is another object of this invention to provide an automatic self-cleaning evaporator drain pan system able to regulate a pumping frequency of a chemical composition.

It is another object of this invention to provide an automatic self-cleaning evaporator drain pan system, whereby a chemical composition mixed with the condensed water drains from a drain outlet toward a drainage line, and the chemical composition prevents microorganism growth, algae, gunk and/or other solid material from forming on the drain pan and the drainage line.

It is another object of this invention to provide an automatic self-cleaning evaporator drain pan system, which is of a durable and reliable construction.

It is yet another object of this invention to provide an automatic self-cleaning evaporator drain pan system that maintains while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
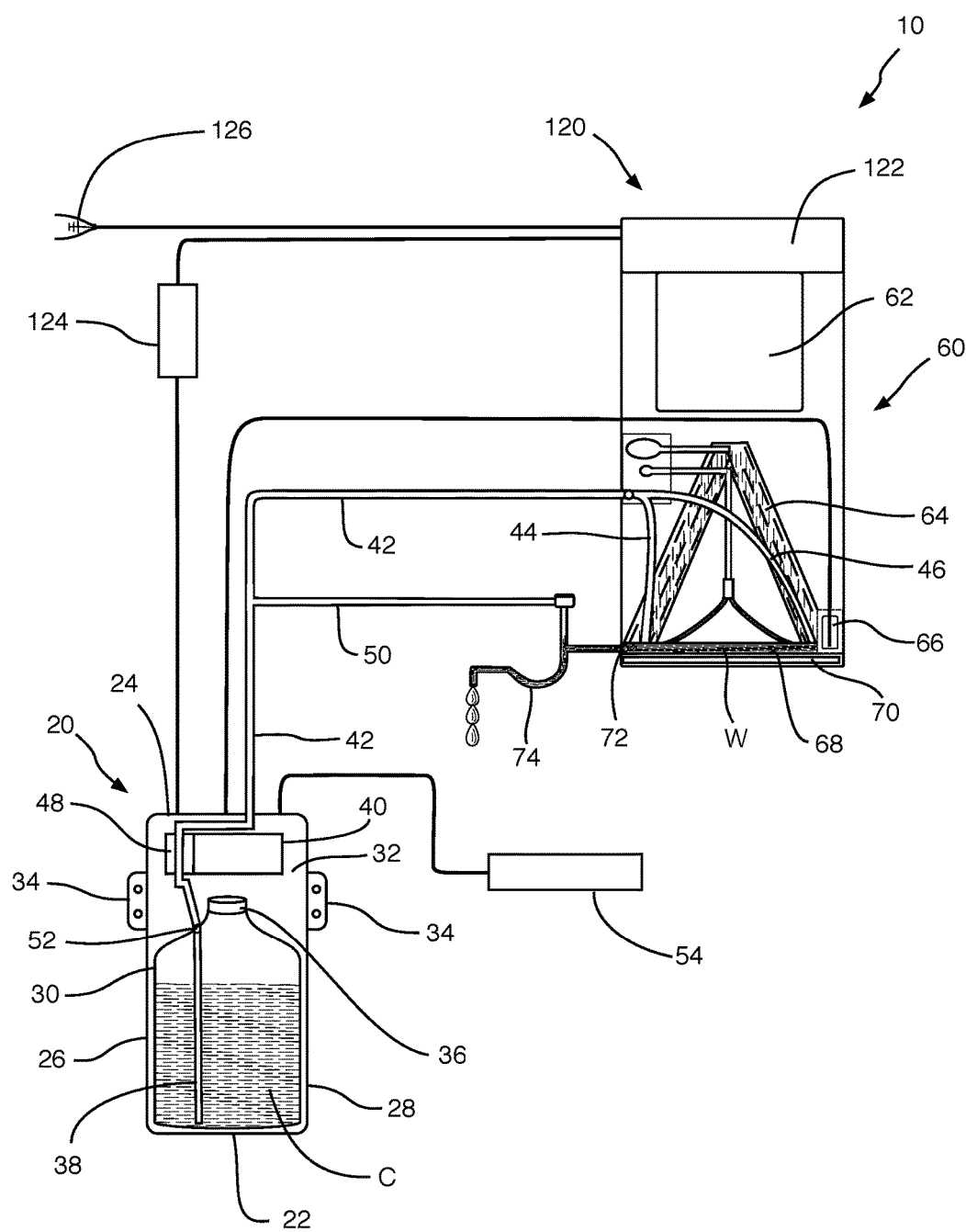
FIG. 1 is a diagram of present invention with an electrical system providing energy to a smart control pump.

Referring now to the drawings, the present invention is an automatic self-cleaning evaporator drain pan system, and is generally referred to with numeral 10. It can be observed that it basically includes container housing 20, evaporator drain system 60, and electrical system 120.

As seen in FIG. 1, container housing 20 houses chemical container 30, and smart control pump 40 having at least one microprocessor 48. At least one microprocessor 48 regulates a pumping frequency of smart control pump 40. Container housing 20 comprises bottom wall 22, top wall 24, first and second lateral walls 26 and 28, and rear wall 32. In a preferred embodiment, first and second lateral walls 26 and 28 comprise respective mounting brackets 34 to secure container housing 20 onto a surface. Container housing 20 further comprises container tubing 38, and chemical conduit 42, which has first and second chemical delivery lines 44 and 46. Chemical container 30 comprises mouth 36, and tubing hole 52.

Chemical container 30 contains chemical composition C. Chemical composition C may be a biocide solution. Such a biocide solution is defined as a chemical substance intended to destroy, deter, render harmless, or exert a controlling effect on any harmful organism by chemical or biological means. Chemical composition C may also be any chemical substance, or combinations thereof, formulated to prevent or eliminate the growth of microorganisms, algae, gunk and/or other solid material that develops on heating, ventilation, and air conditioning systems, and more particularly, on drain pans and/or drainage lines of the heating, ventilation, and air conditioning systems.

Container tubing 38 is positioned inside chemical container 30, and extends from it to connect with smart control pump 40 to allow chemical composition C to be pumped/extracted from chemical container 30. More specifically, a first end of container tubing 38 is positioned inside of chemical container 30, separated a predetermined distance from a bottom of chemical container 30, and a second end of container tubing 38 passes through tubing hole 52 and connects with smart control pump 40.

Chemical conduit 42 extends from smart control pump 40 to evaporator drain system 60, transporting chemical composition C. More specifically, smart control pump 40 pumps chemical composition C through chemical conduit 42. Container housing 20 further comprises display 54 connected to smart control pump 40.

Evaporator drain system 60 comprises blower fan 62, evaporator coils 64, at least one sensor 66, drain pan 68, and air filter 70. First and second chemical delivery lines 44 and 46 extend from chemical conduit 42 to deliver chemical composition C onto drain pan 68. Chemical composition C is mixed with condensed water W inside evaporator drain system 60, specifically on drain pan 68. Evaporator drain system 60 further comprises drain outlet 72 and drainage line 74.

Extending from chemical conduit 42 is conduit 50 that connects with drainage line 74. Conduit 50 delivers chemical composition C directly into drainage line 74. Chemical composition C is mixed with condensed water W on drain pan 68 and drains from drain outlet 72 to drainage line 74. Chemical composition C prevents or eliminates the growth of microorganisms, algae, gunk and/or other solid material on drain pan 68, and drainage line 74 allowing that both keep cleaned.

At least one sensor 66 is connected to smart control pump 40. At least one sensor 66 is activated, and sends signals to smart control pump 40 when drain pan 68 is running out of chemical composition C. At least one microprocessor 48, connected to smart control pump 40, receives signals from at least one sensor 66 to regulate a pumping frequency of chemical composition C. This provides for a predetermined amount of chemical composition C be delivered onto drain pan 68. At least one sensor 66 is also activated when air filter 70 needs replacement, whereby a light of at least one display 54 illuminates.

Electrical system 120 provides required energy for operation of present invention 10. Electrical system 120 comprises power unit 122, regulator 124, and electric connection 126. Power unit 122 operates with 110 or 240 Volt. Regulator 124 converts 110 or 240 Volt AC to 3V, 5V, 12V, or 24V DC for operation of smart control pump 40.

Figure 2:
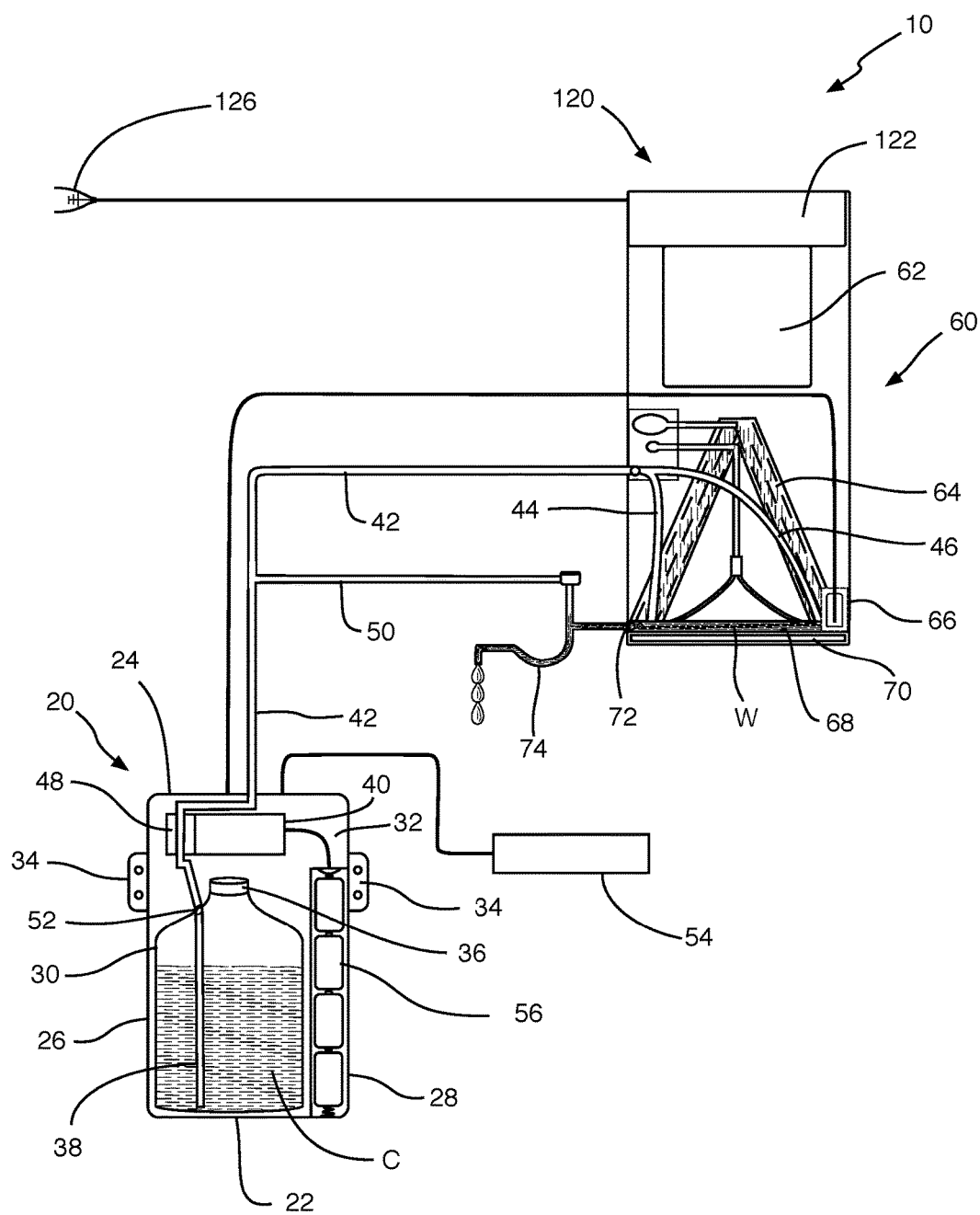
FIG. 2 is a diagram of present invention with batteries providing energy to the smart control pump.

As seen in FIG. 2, in another embodiment, container housing 20 comprises batteries 56 to provide the energy required for operation of smart control pump 40.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An automatic self-cleaning evaporator drain pan system, comprising:
    A) a container housing having a chemical container and a smart control pump, said chemical container contains a chemical composition, said smart control pump comprises at least one microprocessor, said container housing further comprising container tubing that is positioned inside said chemical container and extends from it to connect with said smart control pump to allow said chemical composition to be pumped/extracted from said chemical container, whereby a first end of said container tubing is positioned inside of said chemical container, separated a predetermined distance from a bottom of said chemical container, and a second end of said container tubing connects with said smart control pump, a chemical conduit extends from said smart control pump to an evaporator drain system, transporting said chemical composition, whereby said smart control pump pumps said chemical composition through said chemical conduit, and first and second chemical delivery lines extend from said chemical conduit to deliver said chemical composition onto a drain pan, and extending from said chemical conduit is a conduit that connects with a drainage line, whereby said conduit delivers said chemical composition directly into said drainage line and said chemical composition is mixed with condensed water on said drain pan and drains from a drain outlet to said drainage line;
    B) an evaporator drain system comprising at least one sensor connected to said smart control pump and said drain pan; and
    C) an electrical system.

2. The automatic self-cleaning evaporator drain pan system set forth in claim 1, further characterized in that said container housing comprises a bottom wall, a top wall, first and second lateral walls, and a rear wall.

3. The automatic self-cleaning evaporator drain pan system set forth in claim 1, further characterized in that said chemical container comprises a mouth and a tubing hole.

4. The automatic self-cleaning evaporator drain pan system set forth in claim 1, further characterized in that said container housing further comprises at least one display connected to said smart control pump.

5. The automatic self-cleaning evaporator drain pan system set forth in claim 1, further characterized in that said evaporator drain system comprises a blower fan, evaporator coils, and an air filter.

6. The automatic self-cleaning evaporator drain pan system set forth in claim 5, further characterized in that said at least one sensor is activated when said air filter needs replacement.

7. The automatic self-cleaning evaporator drain pan system set forth in claim 5, further characterized in that said at least one sensor is activated when said drain pan is running out of said chemical composition.

8. The automatic self-cleaning evaporator drain pan system set forth in claim 1, further characterized in that said at least one microprocessor receives signals from said at least one sensor to regulate a pumping frequency of said chemical composition.

9. The automatic self-cleaning evaporator drain pan system set forth in claim 1, further characterized in that said chemical composition mixed with said condensed water drains from said drain outlet toward said drainage line, whereby said chemical composition prevents microorganism growth, algae, gunk and/or other solid material from forming on said drain pan and said drainage line.

* * * * *